United States Patent
Suzuki et al.

(10) Patent No.: US 7,755,690 B2
(45) Date of Patent: *Jul. 13, 2010

(54) SOLID STATE IMAGE SENSOR WITH FIXED PATTERN NOISE REDUCTION

(75) Inventors: Ryoji Suzuki, Kanagawa (JP); Takahisa Ueno, Kanagawa (JP); Koichi Shiono, Kanagawa (JP); Kazuya Yonemoto, Tokyo (JP)

(73) Assignee: Sony Corporation, Tokyo (JP)

( * ) Notice: Subject to any disclaimer, the term of this patent is extended or adjusted under 35 U.S.C. 154(b) by 1002 days.

This patent is subject to a terminal disclaimer.

(21) Appl. No.: 10/627,138

(22) Filed: Jul. 25, 2003

(65) Prior Publication Data

US 2004/0080644 A1    Apr. 29, 2004

Related U.S. Application Data

(62) Division of application No. 09/134,153, filed on Aug. 14, 1998, now Pat. No. 6,677,993.

(51) Int. Cl.
*H04N 3/14* (2006.01)
*H04N 5/217* (2006.01)
*H01L 31/062* (2006.01)
*H01L 27/00* (2006.01)

(52) U.S. Cl. .................. 348/308; 257/291; 250/208.1; 348/241

(58) Field of Classification Search .............. 348/308, 348/294; 257/291; 250/208.1
See application file for complete search history.

(56) References Cited

U.S. PATENT DOCUMENTS 4,809,075 A * 2/1989 Akimoto et al. ............. 348/301

(Continued)

FOREIGN PATENT DOCUMENTS

JP    57-172766    * 10/1982

(Continued)

OTHER PUBLICATIONS

Japanese Patent Office Action corresponding to JP Serial No. 10-022867 dated Sep. 25, 2007.

*Primary Examiner*—Nhan T Tran
(74) *Attorney, Agent, or Firm*—Sonnenschein Nath & Rosenthal LLP

(57) ABSTRACT

A solid-state image sensor comprises unit pixels each having a photoelectric conversion element for converting incident light into electric signal charge and then storing the signal charge obtained through such photoelectric conversion, an amplifying element for converting into an electric signal the signal charge stored in the photoelectric conversion element, and a select switch for selectively outputting the pixel signal from the amplifying element to a signal line. The image sensor further comprises a reset circuit in each of the unit pixels for resetting the photoelectric conversion element every time a pixel signal is outputted from the relevant unit pixel. The photoelectric conversion element is reset every time a pixel signal is outputted, so that a pre-reset signal and a post-reset signal are delivered from each unit pixel and then are transferred via a common path, and the difference between such signals is taken to suppress not only the fixed pattern noise derived from characteristic deviation in each unit pixel but also vertically correlated fixed pattern noises of vertical streaks.

1 Claim, 11 Drawing Sheets

U.S. PATENT DOCUMENTS

| | | | | |
|---|---|---|---|---|
| 4,942,474 A | * | 7/1990 | Akimoto et al. | 348/301 |
| 5,081,536 A | * | 1/1992 | Tandon et al. | 348/313 |
| 5,122,881 A | * | 6/1992 | Nishizawa et al. | 348/308 |
| 5,262,871 A | * | 11/1993 | Wilder et al. | 348/307 |
| 5,287,393 A | * | 2/1994 | Miwada | 257/239 |
| 5,872,371 A | * | 2/1999 | Guidash et al. | 257/292 |
| 6,031,571 A | * | 2/2000 | Arakawa | 348/316 |
| 6,452,633 B1 | * | 9/2002 | Merrill et al. | 348/302 |

FOREIGN PATENT DOCUMENTS

| | | |
|---|---|---|
| JP | 01-117485 | 5/1989 |
| JP | 02-171088 | 7/1990 |
| JP | 04-000880 | 1/1992 |
| JP | 04-241586 | 8/1992 |
| JP | 07-284024 | 10/1995 |
| JP | 11-112018 | 4/1999 |
| JP | 11-122532 | 4/1999 |

* cited by examiner a : SIGNAL READ: SELECTED PIXEL d : STORAGE b : PIXEL RESET: SELECTED PIXEL e : PIXEL RESET: NONSELECTED PIXEL c : NOISE LEVEL READ: SELECTED PIXEL f : NOISE LEVEL READ: NONSELECTED PIXEL

▨ DRAIN LEVEL
▦ SIGNAL CHARGE
▥ RESET GATE FEEDTHROUGH a: SIGNAL READ c: NOISE LEVEL READ b: PIXEL RESET d: STORAGE

▨ DRAIN LEVEL

▨ SIGNAL CHARGE

▥ RESET GATE FEEDTHROUGH

F I G. 13
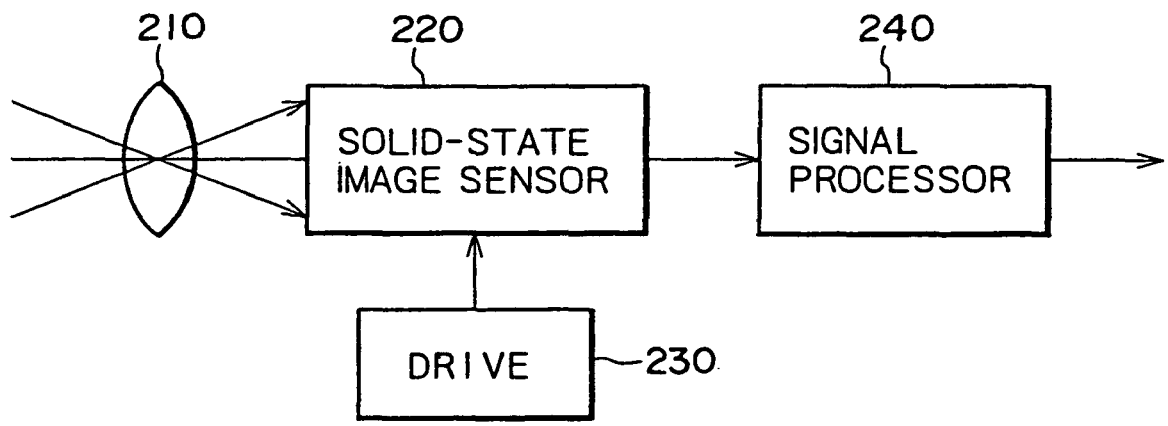
F I G. 14
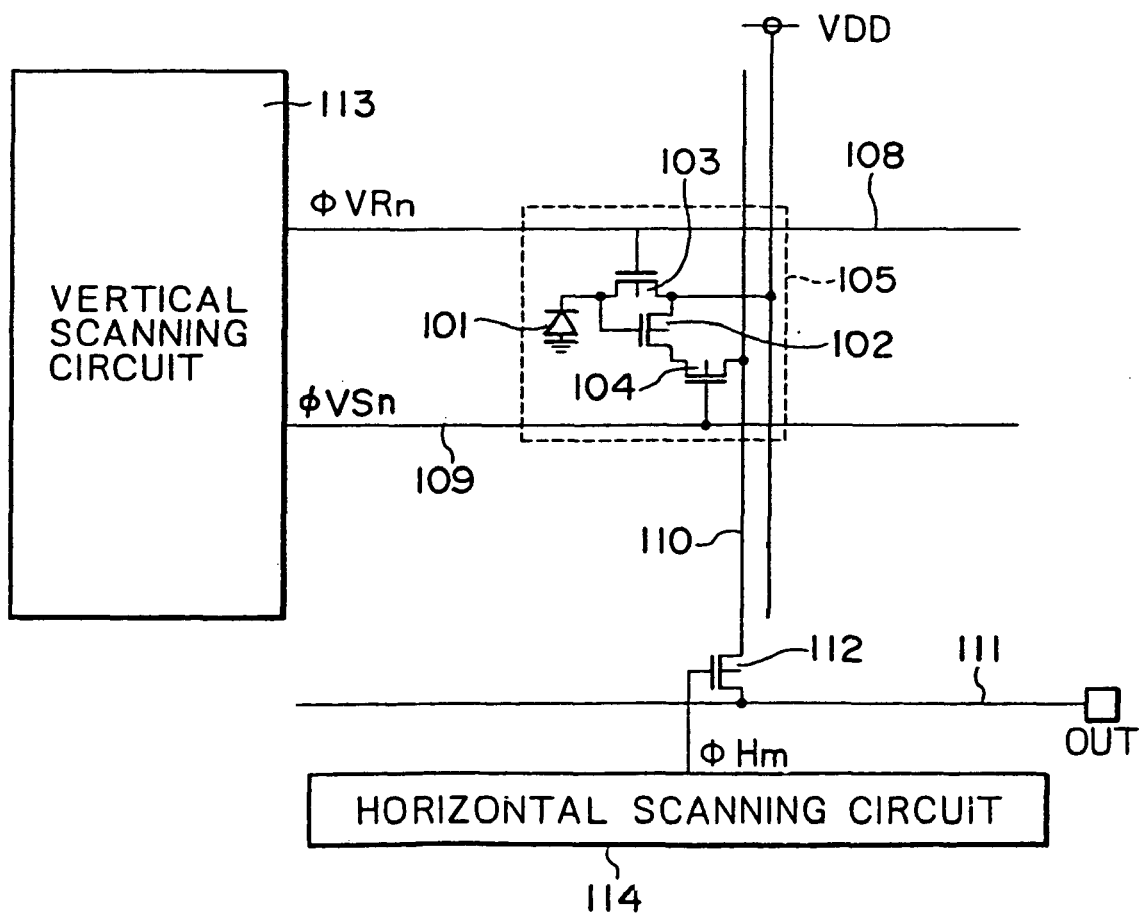

SOLID STATE IMAGE SENSOR WITH FIXED PATTERN NOISE REDUCTION

RELATED APPLICATION DATA

The present application claims priority to Japanese Application No. P09-220264 filed Aug. 15, 1997, and is a divisional of U.S. application Ser. No. 09/134,153, filed Aug. 14, 1998, now U.S. Pat. No. 6,677,993 all of which are incorporated herein by reference to the extent permitted by law.

BACKGROUND OF THE INVENTION

The present invention relates to a solid-state image sensor and a method of driving the same, and more particularly to an amplifying type solid-state imaging device such as a MOS image sensor having an amplifying function per unit pixel, and also to a method of driving such an image sensor.

FIG. 14 shows an exemplary structure of a conventional two-dimensional solid-state image sensor known heretofore as an amplifying type solid-state imaging device in the related art. In this diagram, a unit pixel 105 is composed of a photodiode 101, an amplifying MOS transistor 102, a photodiode reset MOS transistor 103, and a vertical select MOS transistor 104. In this structure, a gate electrode of the photodiode reset MOS transistor 103 is connected to a vertical reset line 108, a gate electrode of the vertical select MOS transistor 104 to a vertical select line 109, and a source electrode of the vertical select MOS transistor 104 to a vertical signal line 110, respectively.

A horizontal select MOS transistor 112 is connected between one end of the vertical signal line 110 and a horizontal signal line 111. The operation of each pixel is controlled per row by two kinds of vertical scanning pulses φVSn and φVRn outputted from a row-select vertical scanning circuit 113, and a pixel signal is outputted to the horizontal signal line 111 via the horizontal select MOS transistor 112 which is controlled by a horizontal scanning pulse φHm outputted from a column-select horizontal scanning circuit 114. At this time, the signal charge stored in the photodiode 101 through photoelectric conversion is converted into a signal current by the amplifying MOS transistor 102 and then is delivered as an output signal of the image sensor.

However, in the known amplifying type two-dimensional solid-state image sensor of the above structure, there exists a problem of characteristic deviation in the active elements constituting each pixel, principally in the amplifying MOS transistor 102, and particularly relative to deviation of the threshold voltage Vth of the MOS transistor. And such deviation is included directly in the output signal of the image sensor. Since this characteristic deviation has a fixed value per pixel, it appears as a fixed pattern noise (FPN) in the picture displayed on a screen. For suppressing such fixed pattern noise, it is necessary to externally connect to the device a noise elimination circuit using a frame memory or a line memory, so as to eliminate any noise component derived from the characteristic deviation in the pixel. As a result, in a camera system or the like employing such a solid-state image sensor as an imaging device, the scale thereof is rendered larger correspondingly to the noise elimination circuit connected thereto externally.

In comparison with the above, there is contrived another amplifying type solid-state image sensor which has a structure of FIG. 15 and is capable of internally suppressing such fixed pattern noise in the device. The difference of this solid-state image sensor resides in the point that, although its unit pixel 105 is structurally the same as FIG. 14, a horizontal output circuit 115 is provided for suppressing the fixed pattern noise derived from the characteristic deviation in the pixel 105, and this horizontal output circuit 115 executes a process of taking the difference between pre-read and post-read (pre-reset and post-reset) signals of the pixel 105.

In FIG. 15, a load MOS transistor 116 serving as a load to the source follower operation of an amplifying MOS transistor 102 is connected between a vertical signal line 110 and the ground. Further, one main electrode of each of paired signal switch MOS transistors 117 and 117' is connected to the vertical signal line 110. And a pair of signal holding capacitors 118 and 118' are connected respectively between the ground and the other main electrodes of such paired signal switch MOS transistors 117 and 117'.

Further a pair of horizontal select MOS transistors 112 and 112' are connected respectively between the other main electrodes of the paired signal switch MOS transistors 117, 117' and a pair of horizontal signal lines 111, 111'. And a noninverting (+) input terminal and an inverting (−) input terminal of a differential amplifier 119 are connected respectively to the pair of horizontal signal lines 111 and 111'.

In the amplifying type solid-state image sensor of the above structure, pixel pre-reset and post-reset signals are held respectively in signal holding capacitors 118, 118' via the signal switch MOS transistors 117, 117' and then are supplied to the differential amplifier 119 via the horizontal select MOS transistors 112, 112' and the horizontal signal lines 111, 111'. Subsequently, the difference between the pixel pre-reset and post-reset signals is taken in the differential amplifier 119 to thereby eliminate the fixed pattern noise derived from the characteristic deviation in each unit pixel.

Although it is possible in the amplifying type solid-state image sensor of the above structure to suppress the fixed pattern noise derived from the characteristic deviation in each unit pixel, the pixel pre-reset and post-reset signals reach the differential amplifier 119 via separate signal paths, so that the characteristic deviations relative to the paired signal switch MOS transistors 117, 117' and the paired horizontal select MOS transistors 112, 112' appear in the picture as fixed pattern noises with vertically correlated streaks. Therefore, this structure also requires an external correction circuit for suppressing the fixed pattern noises with vertical streaks.

SUMMARY OF THE INVENTION

It is an object of the present invention to provide an improved amplifying type solid-state image sensor which is capable of suppressing, within the device, any fixed pattern noise derived from characteristic deviation in each unit pixel and also other fixed pattern noise of vertical streaks. And another object of the invention is to provide a method of driving such an image sensor.

According to a first aspect of the invention, there is provided a solid-state image sensor which comprises unit pixels each having a photoelectric conversion element for converting incident light into electric signal charge and then storing the signal charge obtained through such photoelectric conversion, an amplifying element for converting into an electric signal the signal charge stored in the photoelectric conversion element, and a select switch for selectively outputting the pixel signal from the amplifying element to a signal line; and a reset circuit in each of the unit pixels for resetting the photoelectric conversion element every time a pixel signal is outputted from the relevant unit pixel.

According to a second aspect of the present invention, there is provided a method of driving a solid-state image sensor of the above structure. The method comprises the steps of resetting the photoelectric conversion element every time a pixel signal is outputted from the relevant unit pixel; then delivering a pre-reset signal and a post-reset signal from each unit pixel and taking the difference between the pre-reset signal and the post-reset signal.

And according to a third aspect of the present invention, there is provided a camera which comprises an optical system for focusing incident light from an object scene to form an image thereof; a solid-state image sensor comprising unit pixels each having a photoelectric conversion element for converting the optical image formed by the optical system into electric signal charge and then storing the signal charge obtained through such photoelectric conversion, an amplifying element for converting into an electric signal the signal charge stored in the photoelectric conversion element, and a select switch for selectively outputting the pixel signal from the amplifying element to a signal line, and a reset circuit in each of the unit pixels for resetting the photoelectric conversion element every time a pixel signal is outputted from the relevant unit pixel; a drive capable of driving the solid-state image sensor; and a signal processor for processing the output signal of the solid-state image sensor.

In each of the unit pixels constituting the solid-state image sensor of the structure described above, the photoelectric conversion element is reset every time a pixel signal is outputted, so that a pre-reset signal and a post-reset signal per pixel are outputted successively from each of the unit pixels. In this case, fixed pattern noise derived from any characteristic deviation in the pixel is generated as an offset component from the amplifying element of each pixel. Therefore, the noise component can be canceled by taking the difference between the pre-reset signal and the post-reset signal. Further in the two-dimensional solid-state image sensor, the pre-reset and post-reset signals are outputted from a vertical signal line to a horizontal signal line via a common signal path, so that fundamentally none of vertically correlated streak noise components is generated.

The above and other features and advantages of the present invention will become apparent from the following description which will be given with reference to the illustrative accompanying drawings.

BRIEF DESCRIPTION OF THE DRAWINGS

FIG. 13 is a schematic block diagram showing an exemplary structure of a camera of the present invention which employs a solid-state image sensor of the above structure;

FIG. 14 is a block diagram showing an exemplary known structure of the related art.

DESCRIPTION OF THE PREFERRED EMBODIMENTS

Figure 1:
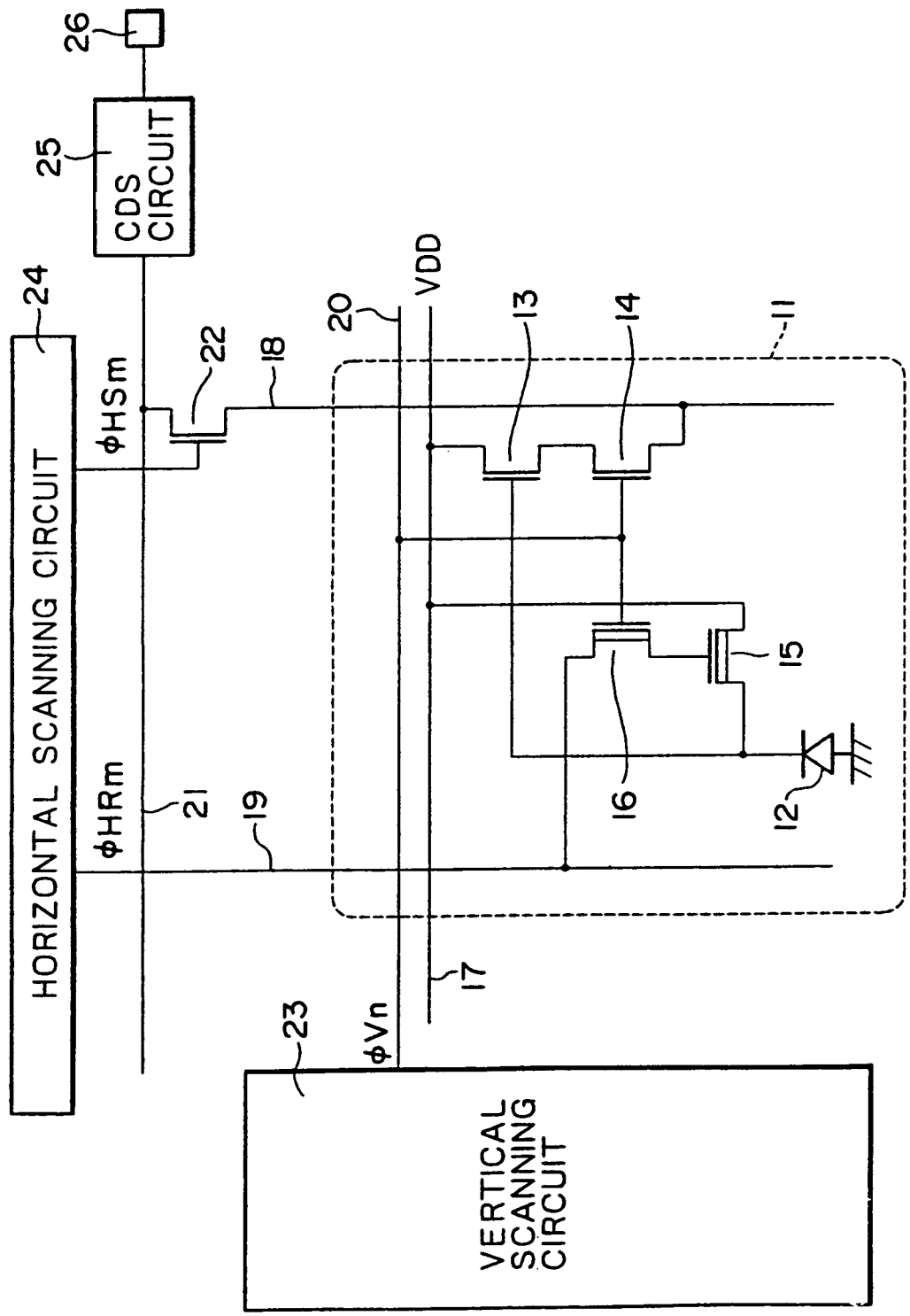
FIG. 1 is a block diagram showing the structure of a first embodiment of the present invention.

Hereinafter some preferred embodiments of the present invention will be described in detail with reference to the accompanying drawings. FIG. 1 is a block diagram showing the structure of a first embodiment of the present invention.

In FIG. 1, the area enclosed with a broken line represents a unit pixel 11. This unit pixel 11 is composed of a photodiode (PD) 12 as a photoelectric conversion element, an amplifying MOS transistor 13 as an amplifying element, a select MOS transistor 14 as a select switch, a reset MOS transistor 15 as a reset switch, and a reset select MOS transistor 16. Entire unit pixels are arrayed two dimensionally to form a matrix of rows and columns. In order to simplify the diagram, merely one unit pixel 11 (mth column, nth row) is shown here.

In this unit pixel 11, the photodiode 12 has a function of executing photoelectric conversion of incident light and storing the signal charge obtained through such photoelectric conversion. A gate electrode of the amplifying MOS transistor 13 is connected to a cathode electrode of the photodiode 12, while a drain electrode of the amplifying MOS transistor 13 is connected to a power supply (VDD) line 17. And the select MOS transistor 14 is connected between a source electrode of the amplifying MOS transistor 13 and a vertical signal line 18.

The reset MOS transistor 15 is connected between the cathode electrode of the photodiode 12 and the power supply line 17, and the reset select MOS transistor 16 is connected between a gate electrode of the reset MOS transistor 15 and a horizontal reset line 19. Each of the reset MOS transistor 15 and the reset select MOS transistor 16 consists of a depletion type transistor. The gate of this reset select MOS transistor 16 is connected to a vertical select line 20 together with the gate electrode of the select MOS transistor 14. And a horizontal select MOS transistor 22 is connected between the vertical signal line 18 and a horizontal signal line 21.

Further a row-select vertical scanning circuit 23 and a column-select horizontal scanning circuit 24 are provided. A vertical scanning pulse φVn outputted from the vertical scanning circuit 23 is applied to the vertical select line 20, a horizontal reset pulse φHRm outputted from the horizontal scanning circuit 24 is applied to the horizontal reset line 19, and a horizontal scanning pulse φHSm to the gate electrode of the horizontal select MOS transistor 22, respectively. Thus, the circuit configuration is simplified since the horizontal scanning circuit 24' serves also as a reset circuit which generates a horizontal reset pulse φHRm.

A correlated double sampling circuit (hereinafter referred to as CDS circuit) 25 of a simple configuration is provided at the output end of the horizontal signal line 21 to serve as a differential circuit which takes the difference between pixel pre-reset and post-reset signals. A concrete configuration of this CDS circuit 25 will be explained later in detail together with its operation. The output end of the CDS circuit 25 is connected to an output terminal 26 of the image sensor.

Now the operation of the amplifying type solid-state image sensor in the first embodiment of the above structure will be described below with reference to a timing chart of FIG. 2.

First, the signal charge (electron) stored in the photodiode 12 through photoelectric conversion is converted into an electric signal by the amplifying MOS transistor 13. And subsequently during a horizontal video period, a vertical scanning pulse φVn is outputted from the vertical scanning circuit 23, and then is applied to the respective gate electrodes of the select MOS transistor 14 and the reset select MOS transistor 16 via the vertical select line 20. Consequently these MOS transistors 14 and 16 are turned on, so that the signal current appears on the vertical signal line 18 via the select MOS transistor 14.

During this horizontal video period, a horizontal scanning pulse φHSm is outputted from the horizontal scanning circuit 24, and then is applied to the gate electrode of the horizontal select MOS transistor 22. Consequently the MOS transistor 22 is turned on, so that the signal current appearing on the vertical signal line 20 is caused to flow in the horizontal signal line 21 via the horizontal select MOS transistor 22, whereby the signal current is supplied via the horizontal signal line 21 to the CDS circuit 25.

Immediately thereafter, a horizontal reset pulse φHRm is supplied from the horizontal scanning circuit 24 to the horizontal reset line 19 with regard to the relevant pixel which has outputted the signal current. Since the reset select MOS transistor 16 is in its on-state at this time, the horizontal reset pulse φHRm is applied to the gate electrode of the reset MOS transistor 15 via the reset select MOS transistor 16. Consequently the reset MOS transistor 15 is turned on to thereby reset the photodiode 12 to the VDD level.

Figure 2:
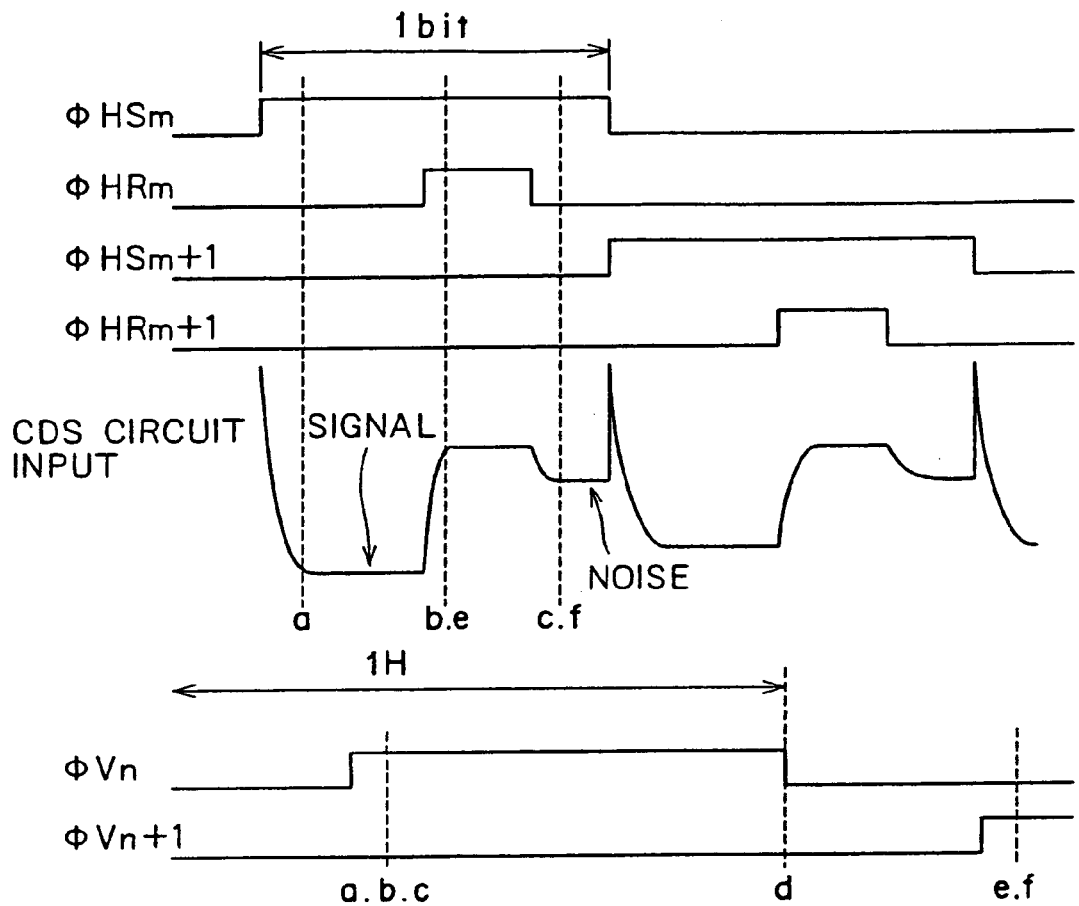
FIG. 2 is a timing chart of signals for explaining the operation of the first embodiment.

As obvious from the timing chart of FIG. 2, this horizontal reset pulse φHRm is generated substantially at the midpoint of generation of the horizontal scanning pulse φHSm. Therefore, the charge (noise component) of the photodiode 12 after extinction of the horizontal reset pulse φHRm, i.e., the post-reset signal charge thereof, is converted into a current by the amplifying MOS transistor 13, and this reset current flows in the horizontal signal line 21 via the on-state select MOS transistor 14, the vertical signal line 18 and the on-state horizontal select MOS transistor 22, and subsequently such reset current is supplied to the CDS circuit 25 via the horizontal signal line 21.

Due to a series of the operations mentioned, a signal output and a reset output are obtained sequentially in the form of signal output→PD reset→noise output relative to one pixel 11. Such operations are performed in respect of the pixel row selected by the vertical scanning circuit 23 with sequential selection of pixels by the horizontal scanning circuit 24, so that the outputs are delivered to the horizontal signal line 21 in the order of mth column, nth row (signal output→PD reset→noise output), (m+1)th column, nth row (signal output PD reset→noise output) . . . and so forth, and then are supplied to the CDS circuit 25. Subsequently, correlated double sampling is executed in this CDS circuit 25 on the basis of such pre-reset and post-reset noise outputs, hence eliminating the characteristic deviation principally in the amplifying MOS transistor 13.

Figure 3:
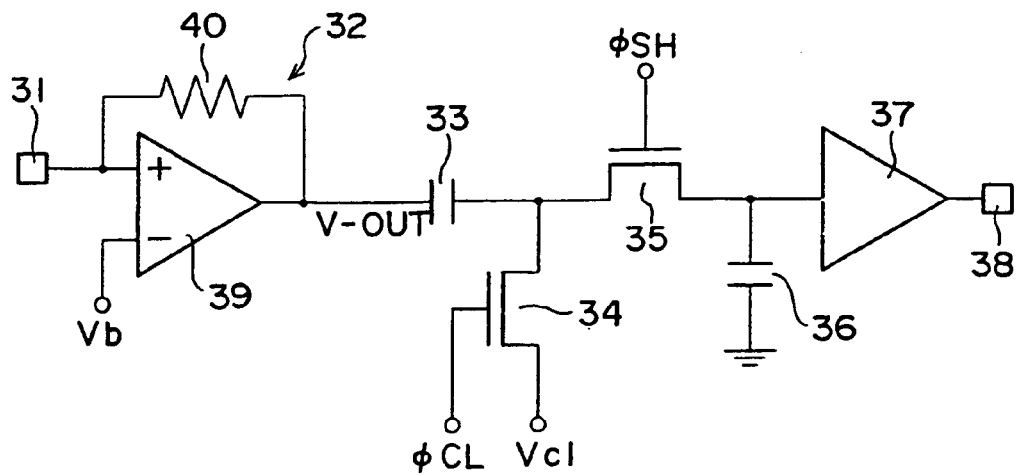
FIG. 3 is a circuit diagram showing an exemplary configuration of a CDS circuit.

FIG. 3 shows an exemplary concrete configuration of the CDS circuit 25. This circuit 25 comprises a current-voltage converter 32 whose input end is connected to an input terminal 31, a clamp capacitor 33 whose one end is connected to an output end of the current-voltage converter 32, a clamp MOS transistor 34 whose one main electrode is connected to the other end of the clamp capacitor 33, a sample hold MOS transistor 35 whose one main electrode is connected to the other end of the clamp capacitor 33, a sample hold capacitor 36 connected between the other main electrode of the sample hold MOS transistor 35 and the ground, and a buffer amplifier 37 connected between the other main electrode of the sample hold MOS transistor 35 and an output terminal 38.

In this CDS circuit 25, the current-voltage converter 32 consists of a differential amplifier 39 which receives, at its inverting (−) input, a signal current supplied via the input terminal 31, and also receives a predetermined bias voltage Vb at its non-inverting (+) input; and a feedback resistor 40 connected between the inverting input end of the differential amplifier 39 and the output end thereof. This converter 32 serves to convert the signal current into a signal voltage. A clamp voltage Vcl is applied to the other main electrode of the clamp MOS transistor 34, and a clamp pulse φCL to the gate electrode thereof, respectively. Further, a sample hold pulse φSH is applied to the gate electrode of the sample hold MOS transistor 35.

Thus, due to such correlated double sampling based on the pre-reset signal output and the post-reset noise output by using the CDS circuit 25 of the above configuration as a differential circuit, it becomes possible to eliminate the characteristic deviation of the amplifying MOS transistor 13 per pixel, particularly the threshold voltage (Vth) deviation of the MOS transistor.

As described above, the photodiode 12 of each unit pixel 11 is reset every time one pixel signal is outputted, and correlated double sampling is executed on the basis of the pre-reset signal output and the post-reset noise output, hence suppressing the fixed pattern noise derived from the characteristic deviation in the pixel and also the fixed pattern noise of vertical streaks derived from the characteristic deviation in the switch element (horizontal select MOS transistor 22) connected to the vertical signal line 18.

The fixed pattern noise derived from the characteristic deviation in the pixel is generated as an offset component from the amplifying MOS transistor 13 of the unit pixel 11, and fundamentally this noise can be eliminated by executing correlated double sampling of the pixel pre-reset and post-reset signals. As for the other fixed pattern noise of vertical streaks derived from the characteristic deviation in the switch element connected to the vertical signal line 18, the circuit configuration is so contrived as to supply the pixel pre-reset and post-reset signals via the same signal path, not via separate switch elements (e.g., horizontal select MOS transistors), thereby preventing generation of such noise in principle.

Now a further detailed description will be given below on the operation of resetting the photodiode 12. As obvious from FIG. 1, each of the reset MOS transistor 15 and the reset select MOS transistor 16 consists of a depletion type transistor.

Figure 4A:
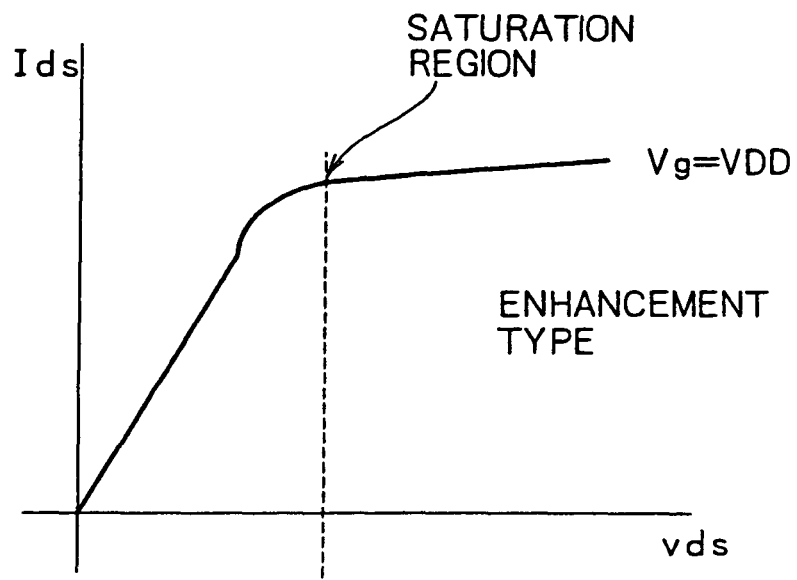
FIGS. 4A and 4B graphically show Id-Vd characteristics of an enhancement type MOS transistor and a depletion type MOS transistor, respectively.

In case an enhancement type transistor is employed as the reset select MOS transistor 16, there arises a problem that, when resetting the photodiode 12 to the VDD level, the reset select MOS transistor 16 acts in its saturation region as shown in FIG. 4A if a horizontal reset pulse φHRm is applied to the drain electrode thereof in the state selected by a vertical scanning pulse φVn, so that the source potential is rendered lower than the drain potential.

Figure 4B:
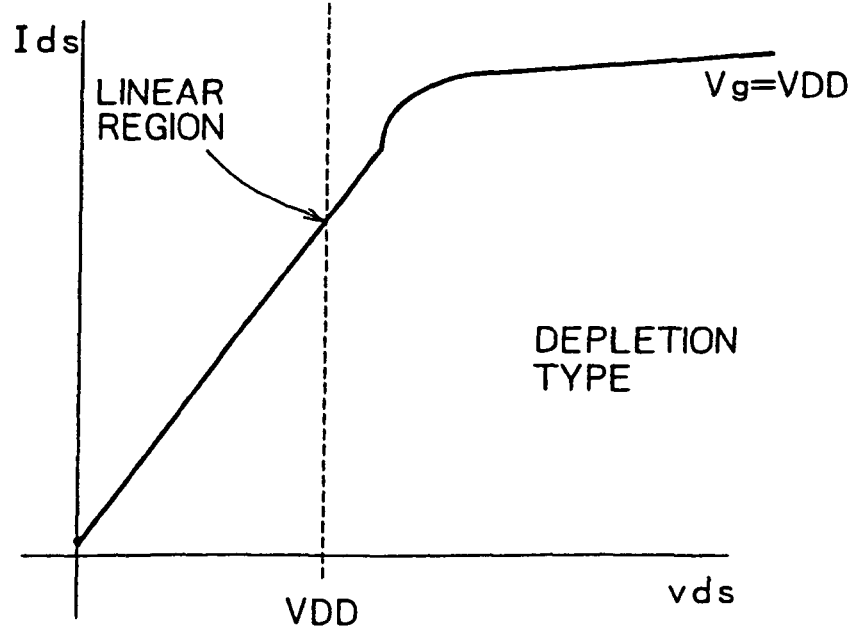

Meanwhile, in case a depletion type transistor is employed as the reset select MOS transistor 16, this transistor acts in its linear region as shown in FIG. 4B, so that the source potential substantially reaches the drain potential. Similarly, in case an enhancement type transistor is employed as the reset MOS transistor 15, resetting is performed in its saturation region, so that some charge may be left unremoved if the reset time is short, hence causing residual image. However, in case a depletion type transistor is employed, resetting is performed in its linear region to thereby achieve complete resetting without any unremoved charge.

Figure 5:
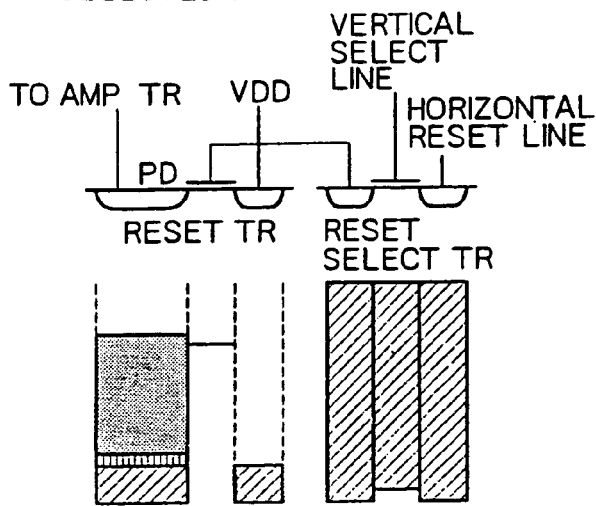
FIG. 5 is a potential diagram for explaining the operation of a reset circuit in the first embodiment.
Figure 5:
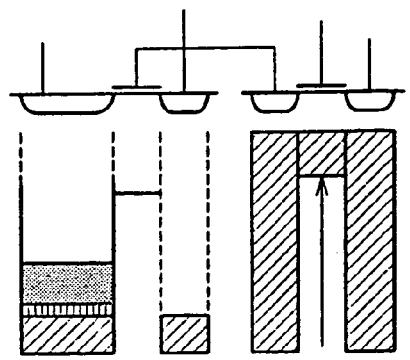
Figure 5:
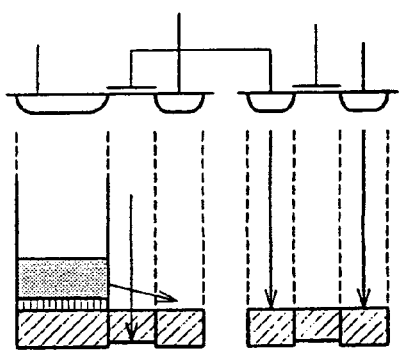
Figure 5:
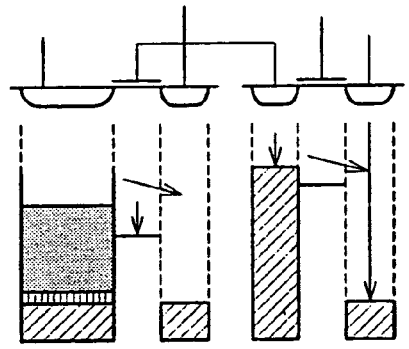
Figure 5:
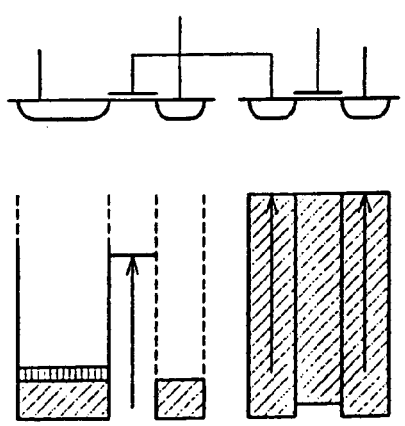
Figure 5:
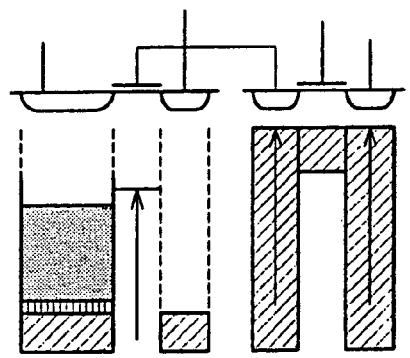

Next, the operation of the amplifying type solid-state image sensor in the embodiment of the above structure will be described below with reference to a potential diagram of FIG. 5 on the basis of a timing chart of FIG. 2.

In a selected-pixel signal read mode (timing a in FIG. 2), the reset select MOS transistor 16 is turned on by a vertical scanning pulse φVn, so that a low-level potential of a horizontal reset pulse φHRm corresponding to the source potential is applied to the gate electrode of the reset MOS transistor 15. Since this MOS transistor 15 is not turned on at this time, the signal charge stored in the photodiode 12 is converted into a signal current by the amplifying MOS transistor 13.

In a selected-pixel reset mode (timing b in FIG. 2), a high-level horizontal reset pulse φHRm is applied to the gate electrode of the reset MOS transistor 15 via the reset select MOS transistor 16 in an on-state, so that the reset MOS transistor 15 is turned on to thereby reset the photodiode 12 completely to the VDD level in its linear region.

In a selected-pixel noise level read mode (timing c in FIG. 2), the horizontal reset pulse φHRm is at its low level, and therefore a low-level potential is applied to the gate electrode of the reset MOS transistor 15 via the reset select MOS transistor 16 in an on-state, whereby the reset MOS transistor 15 is turned off. Consequently the reset level is converted into a noise current by the amplifying MOS transistor 13. And simultaneously, storage of the next frame is started at this time point.

In a signal charge storage mode (timing d in FIG. 2), i.e., at the time of reading another row and another column, the vertical scanning pulse φVm is changed to a low level. However, since the reset select MOS transistor 16 is of a depletion type, the gate electrode of the reset MOS transistor 15 is kept at its low level without being placed in a floating state.

In a nonselected-pixel reset mode (timing e in FIG. 2), the drain of the reset select MOS transistor 16 is turned to the VDD level by a high-level horizontal reset pulse φHRm, and then the potential corresponding to the low level of the gate electrode of the reset select MOS transistor 16 is applied to the gate electrode of the reset MOS transistor 15. In the photodiode 12, the depletion reset gate serves directly as a transverse overflow barrier, and any excess charge above this level is dumped to the power supply. And the overflow barrier is lowered at this time point, where the overflow level is thereby determined.

Figure 6:
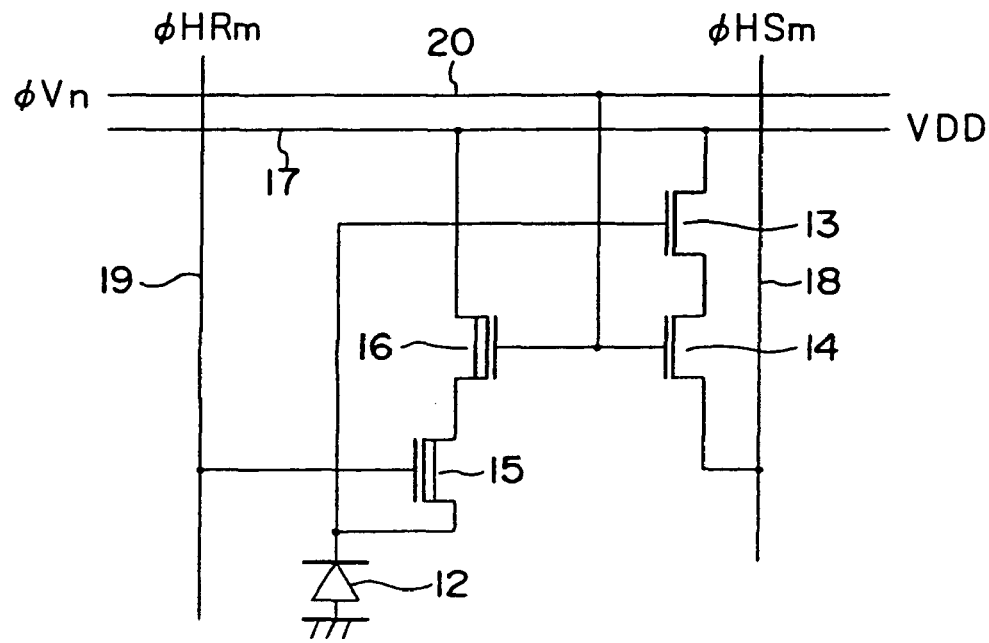
FIG. 6 is a circuit diagram showing another structural example of a unit pixel.
Figure 7:
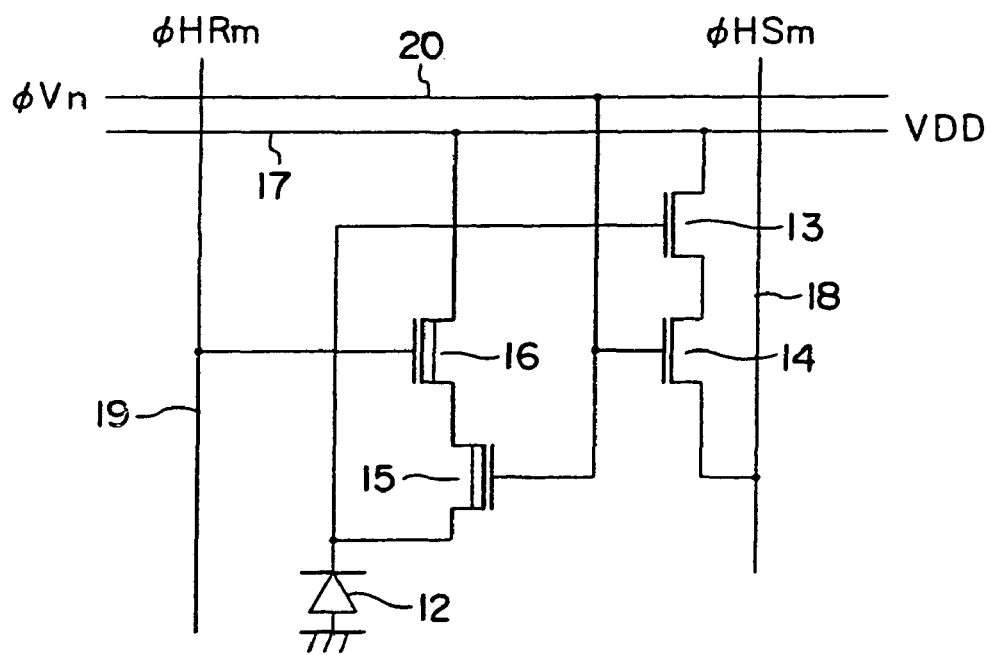
FIG. 7 is a circuit diagram showing a further structural example of a unit pixel.

Regarding the structure of each unit pixel, there is generally contrived an example where, as shown in FIG. 6 or FIG. 7, the reset MOS transistor 15 and the reset select MOS transistor 16 are connected in series between the cathode electrode of the photodiode 12 and the power supply line 17, and a horizontal reset pulse φHRm or a vertical scanning pulse φVn is applied to the gate electrode of the reset MOS transistor 15, while a vertical scanning pulse φVn or a horizontal reset pulse φHRm is applied to the gate electrode of the reset select MOS transistor 16.

In such an exemplary Structure, however, there exists a disadvantage that the feedthrough obtained by the reset MOS transistor 15 and the reset select MOS transistor 16 at the time of reading the noise level becomes different from the feedthrough at the time of reading the signal level, hence causing some deviation per pixel. The reason thereof will now be described below with reference to a potential diagram of FIG. 8 which corresponds to the structure of FIG. 6.

Suppose first that status 1 represents a condition where a pixel is selected by generation of a vertical scanning pulse φVn and resetting is executed by generation of a horizontal reset pulse φHRm. In status 1, the photodiode 12 is reset to the VDD level. Subsequently in status 2, the horizontal reset pulse φHRm is extinct, and the potential of the photodiode 12 is rendered slightly shallower than the VDD level due to the feedthrough when the reset MOS transistor 15 is turned off. In this status, a noise level read mode is assumed.

In status 3, a nonselection mode is assumed upon extinction of the vertical scanning pulse φVn. The potential of the diffusion region between the reset MOS transistor 15 and the reset select MOS transistor 16 is rendered slightly shallower than the VDD level due to the feedthrough when the reset select MOS transistor 16 is turned off.

Status 4 represents a charge storage condition where the potential of the photodiode 12 is shallowed by the stored charge. Status 5 represents a nonselection reset condition where the same column on the other rows is reset. In this status, the reset MOS transistor 15 is turned on by generation of a horizontal reset pulse φHRm, so that the signal charge, the reset gate feedthrough and the reset select gate feedthrough are adjusted.

In status 6, the reset gate feedthrough is further added to the photodiode 12 upon extinction of the horizontal reset pulse φHRm. Status 5 and status 6 are repeated during a period of reading the other rows. In status 7, the reset select MOS transistor 16 is turned on by generation of a vertical scanning pulse φVn, and the signal level is read in this status. Thereafter the operation returns to status 1.

Figure 8:
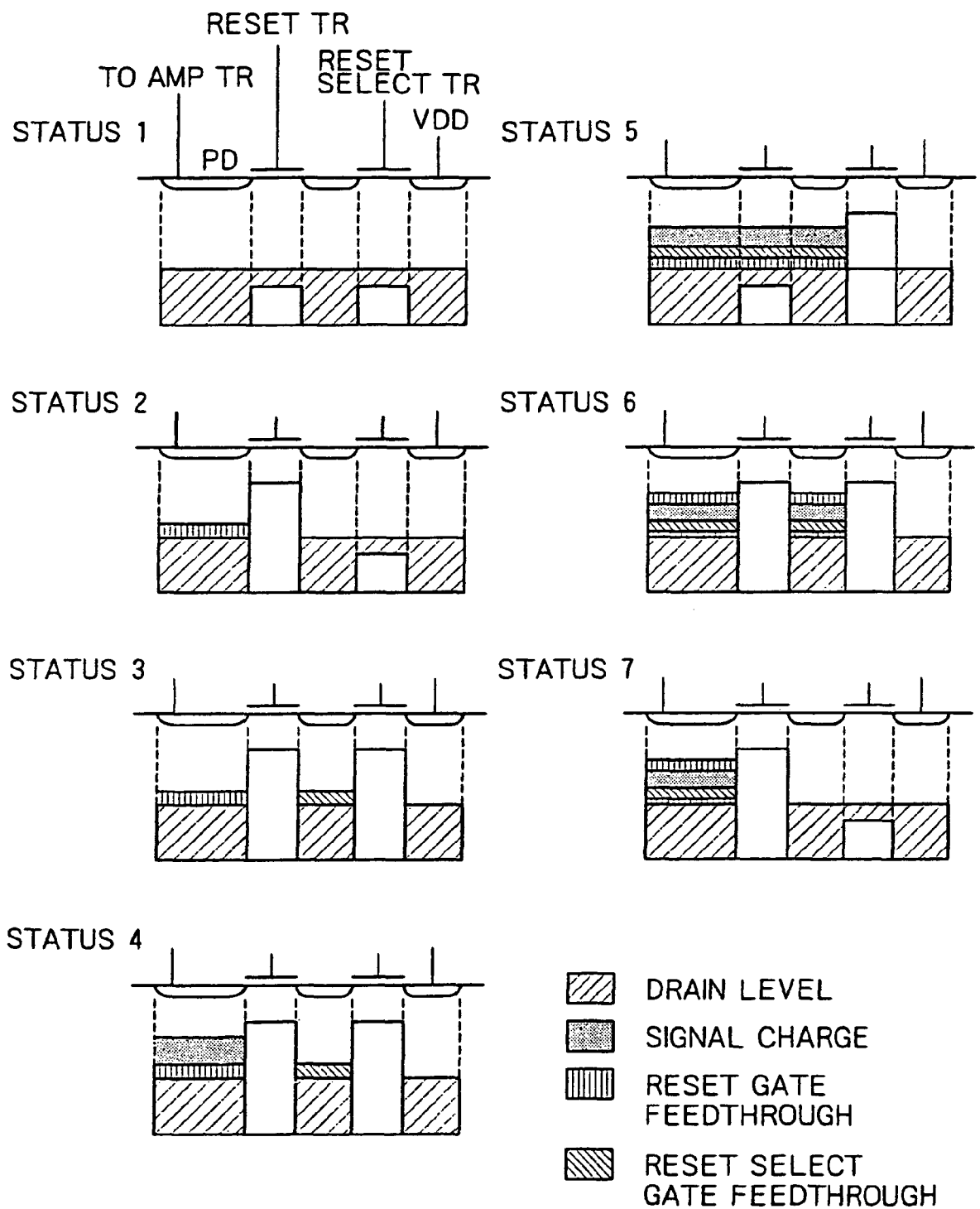
FIG. 8 is a potential diagram corresponding to the structure of FIG. 5.

As obvious from a comparison of status 2 with status 7 in the potential diagram of FIG. 8, the charge quantity stored in the photodiode 12 due to the feedthrough at the noise level read time in status 2 is different from the charge quantity stored at the signal level read time in status 7. Since the feedthrough quantity differs depending on individual transistors similarly to the threshold voltage deviation, the feedthrough difference between the signal level read mode and the noise level read mode cannot be canceled in the CDS circuit 25 which is used to suppress the pixel deviation, whereby such feedthrough difference is left unmoved as pixel deviation.

Figure 9:
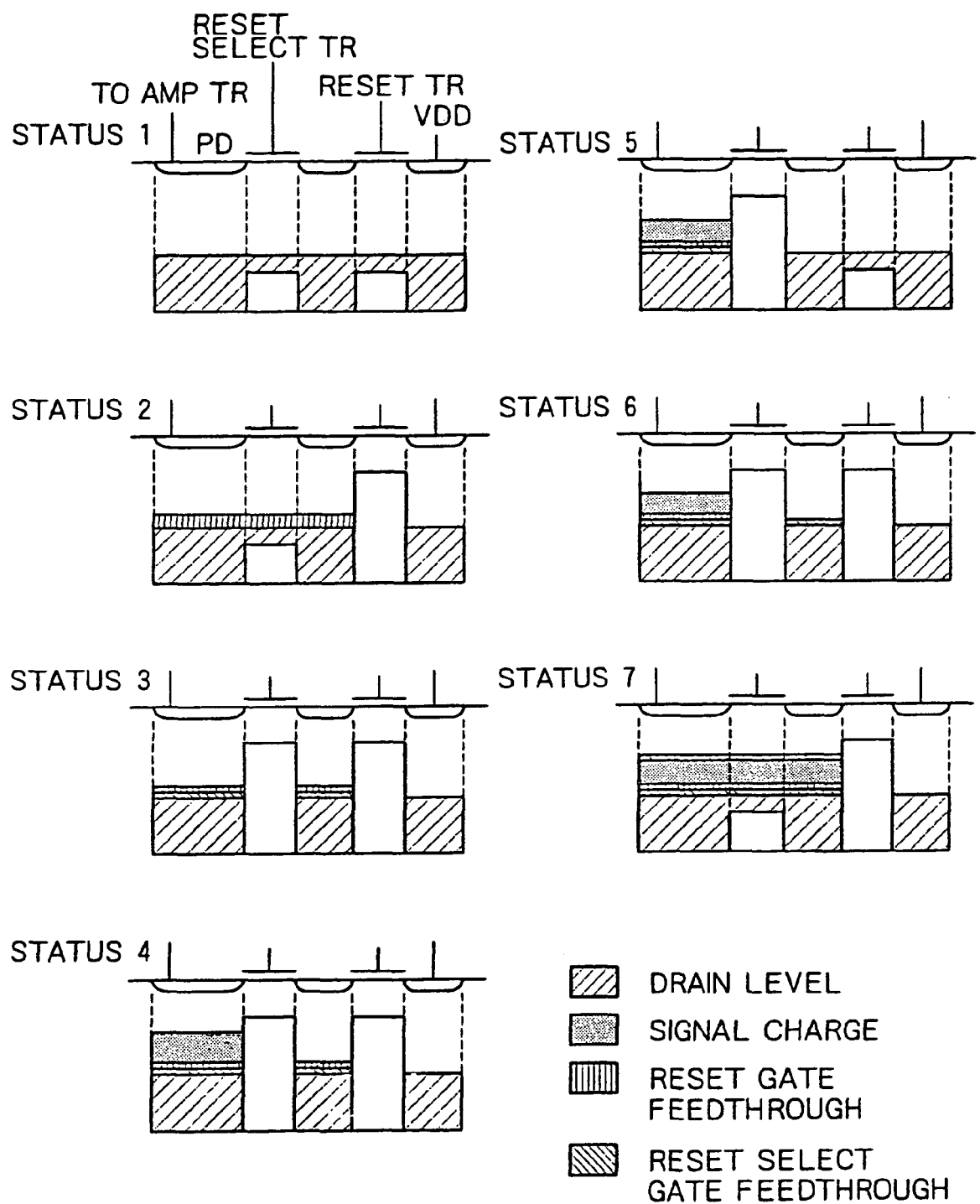
FIG. 9 is a potential diagram corresponding to the structure of FIG. 6.

Also in the structure of FIG. 7 where the reset MOS transistor 15 and the reset select MOS transistor 16 are mutually connected in reverse relationship, the same disadvantage as that in the structure of FIG. 6 is still existent, as obvious from a potential diagram of FIG. 9.

In contrast therewith, this embodiment is so contrived that the source electrode of the reset select MOS transistor 16 is connected to the gate electrode of the reset MOS transistor 15, and a horizontal reset pulse φHRm is applied to the gate electrode of the reset MOS transistor 15 via the drain and source electrodes of the reset select MOS transistor 16. Therefore, in either the noise read mode or the signal read mode, the operation is not affected harmfully by the feedthrough relative to the reset select gate, hence enabling the CDS circuit 25 in the following stage to suppress the feedthrough deviation derived from the reset gate per pixel.

Figure 10:
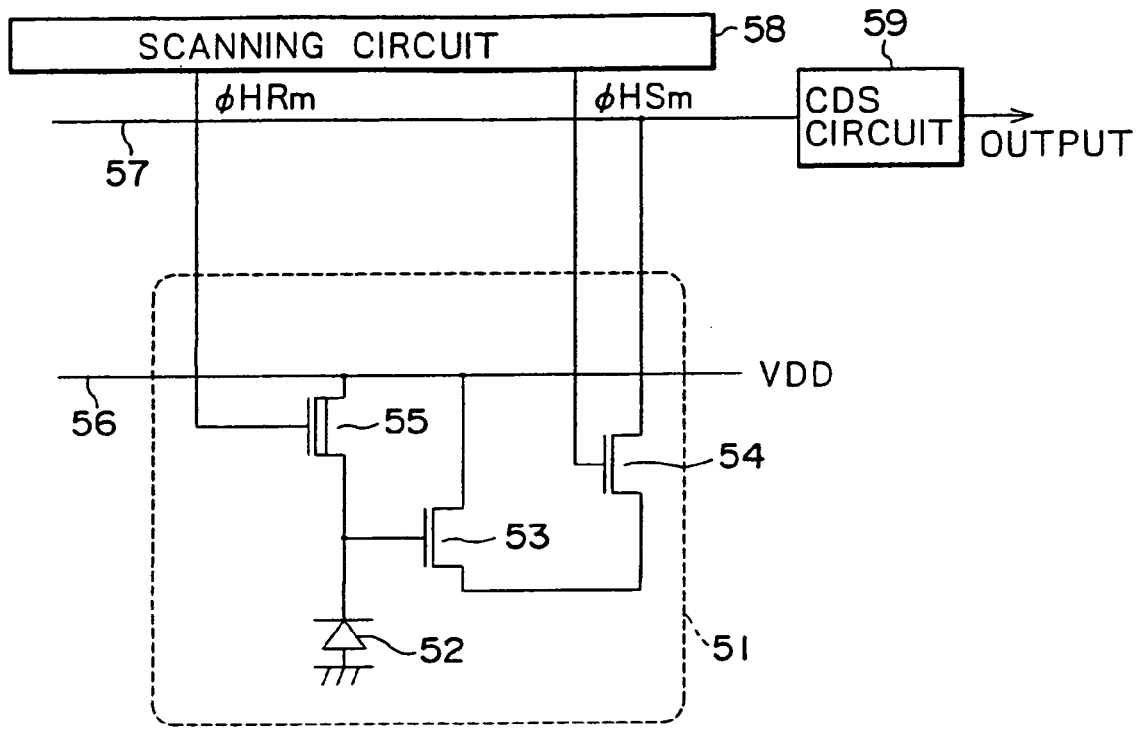
FIG. 10 is a block diagram showing the structure of a second embodiment of the present invention.

FIG. 10 is a block diagram showing the structure of a second embodiment of the present invention applied to a one-dimensional solid-state image sensor.

In FIG. 10, the area enclosed with a broken line represents a unit pixel 51. This unit pixel 51 is composed of a photodiode (PD) 52 as a photoelectric conversion element, an amplifying MOS transistor 53 as an amplifying element, a select MOS transistor 54 as a select switch, and a reset MOS transistor 55 as a reset switch. Entire unit pixels are arrayed linearly in a one-dimensional arrangement.

In this unit pixel 51, the photodiode 52 has a function of executing photoelectric conversion of incident light and storing the signal charge obtained through such photoelectric conversion. A gate electrode of the amplifying MOS transistor 53 is connected to a cathode electrode of the photodiode 52, while a drain electrode of the amplifying MOS transistor 53 is connected to a power supply (VDD) line 56.

The select MOS transistor 54 is connected between a source electrode of the amplifying MOS transistor 53 and a signal line 57. And the reset MOS transistor 55 is connected between the cathode electrode of the photodiode 52 and the power supply line 56. The reset MOS transistor 55 consists of a depletion type transistor.

Further a scanning circuit 58 is provided for sequentially selecting the unit pixels 51 arrayed one-dimensionally. And a scanning pulse φHSm outputted from the scanning circuit 58 is applied to the gate electrode of the select MOS transistor 54, and a reset pulse φHRm to the gate electrode of the reset MOS transistor 55, respectively. Thus, the circuit configuration is simplified since the scanning circuit 58 serves also as a reset circuit which generates a reset pulse φHRm.

A CDS circuit 59 of a simple configuration is provided at the output end of the signal line 57 to serve as a differential circuit which takes the difference between pixel pre-reset and post-reset signals. Similarly to the foregoing first embodiment, this CDS circuit 59 is so composed as shown in FIG. 3.

Now the operation of the amplifying type solid-state image sensor in the second embodiment of the above structure will be described below with reference to a timing chart of FIG. 11.

First, the signal charge (electron) stored in the photodiode 52 through photoelectric conversion is further converted into a charge signal by the amplifying MOS transistor 53. And when a scanning pulse φHSm is outputted from the scanning circuit 58, the select MOS transistor 54 is turned on, so that a signal current is supplied via the select MOS transistor 54 to the CDS circuit 59 by way of the signal line 57.

Immediately thereafter, a reset pulse φHRm is outputted from the scanning circuit 58 with regard to the relevant pixel which has outputted the signal current, and then this pulse is applied to the gate electrode of the reset MOS transistor 55. Since the reset MOS transistor 55 is thereby turned on at this time, the photodiode 52 is reset to the VDD level.

Figure 11:
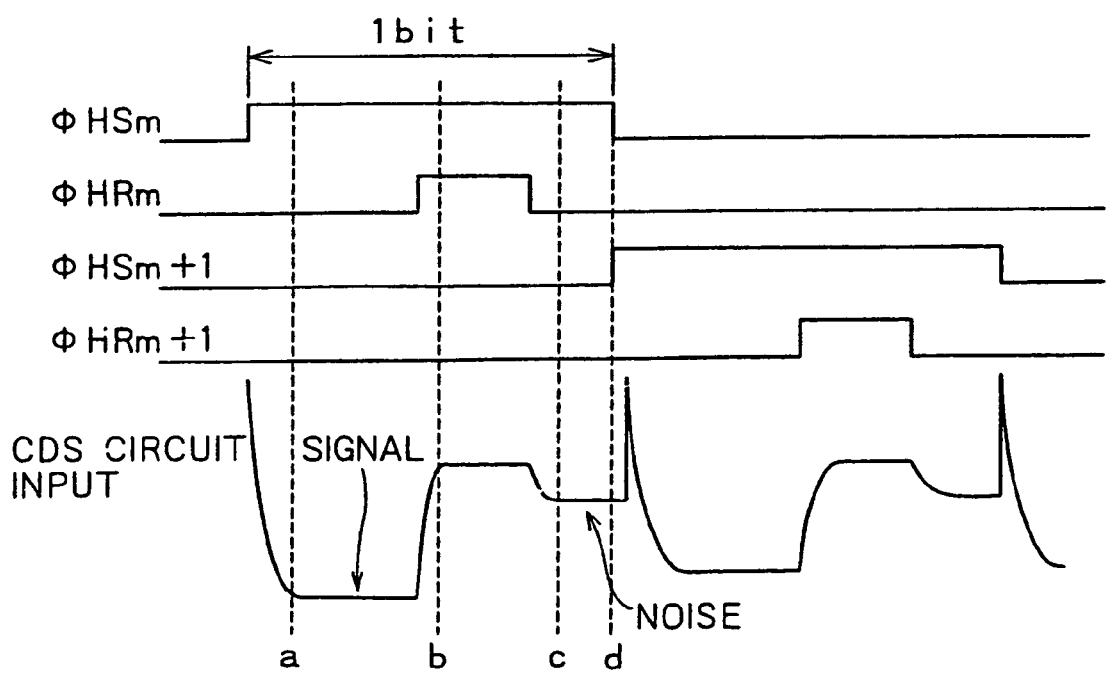
FIG. 11 is a timing chart of signals for explaining the operation of the second embodiment.

As obvious from the timing chart of FIG. 11, this reset pulse φHRm is generated in the duration (high-level period) of the scanning pulse φHSm. Therefore, the charge (noise component) of the photodiode 52 after extinction of the reset pulse φHRm, i.e., the post-reset signal charge thereof, is converted into a current by the amplifying MOS transistor 53, and this reset current flows in the signal line 57 via the on-state select MOS transistor 54, and subsequently such reset current is supplied to the CDS circuit 59 via the signal line 57.

Due to a series of the operations mentioned, a signal output and a reset output are obtained sequentially in the form of signal output→PD reset→noise output relative to one pixel 51, and then are supplied to the CDS circuit 59. Subsequently, correlated double sampling is executed in this CDS circuit 59 on the basis of such pre-reset and post-reset noise outputs, hence eliminating the characteristic deviation principally in the amplifying MOS transistor 53.

Now a further detailed description will be given below on the operation of resetting the photodiode 52. As obvious from FIG. 10, the reset MOS transistor 55 consists of a depletion type transistor.

In case an enhancement type transistor is employed as the reset MOS transistor 55, there arises a problem that, when resetting the photodiode 52 to the VDD level, the reset MOS transistor 55 acts in its saturation region as shown in FIG. 4A if the voltage from the power supply VDD is applied to the drain electrode thereof in the state selected by the reset pulse φHRm, so that the source potential is rendered lower than the drain potential, and some charge may be left unremoved if the reset time is short, hence causing residual image.

Meanwhile, in case a depletion type transistor is employed as the reset MOS transistor 55, this transistor acts in its linear region as shown in FIG. 4B, so that the source potential substantially reaches the drain potential to thereby achieve complete resetting without any unremoved charge.

Figure 12:
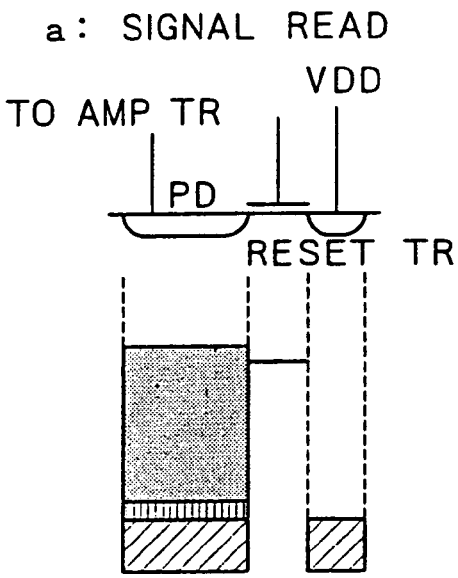
FIG. 12 is a potential diagram for explaining the operation of a reset circuit in the second embodiment.
Figure 12:
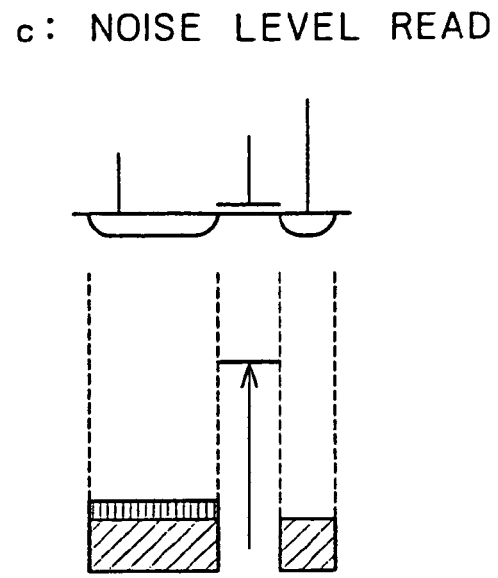
Figure 12:
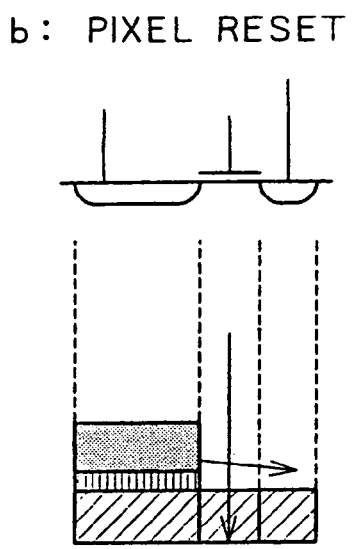
Figure 12:
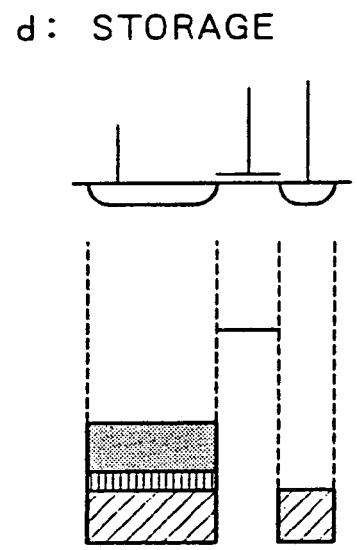
Figure 15:
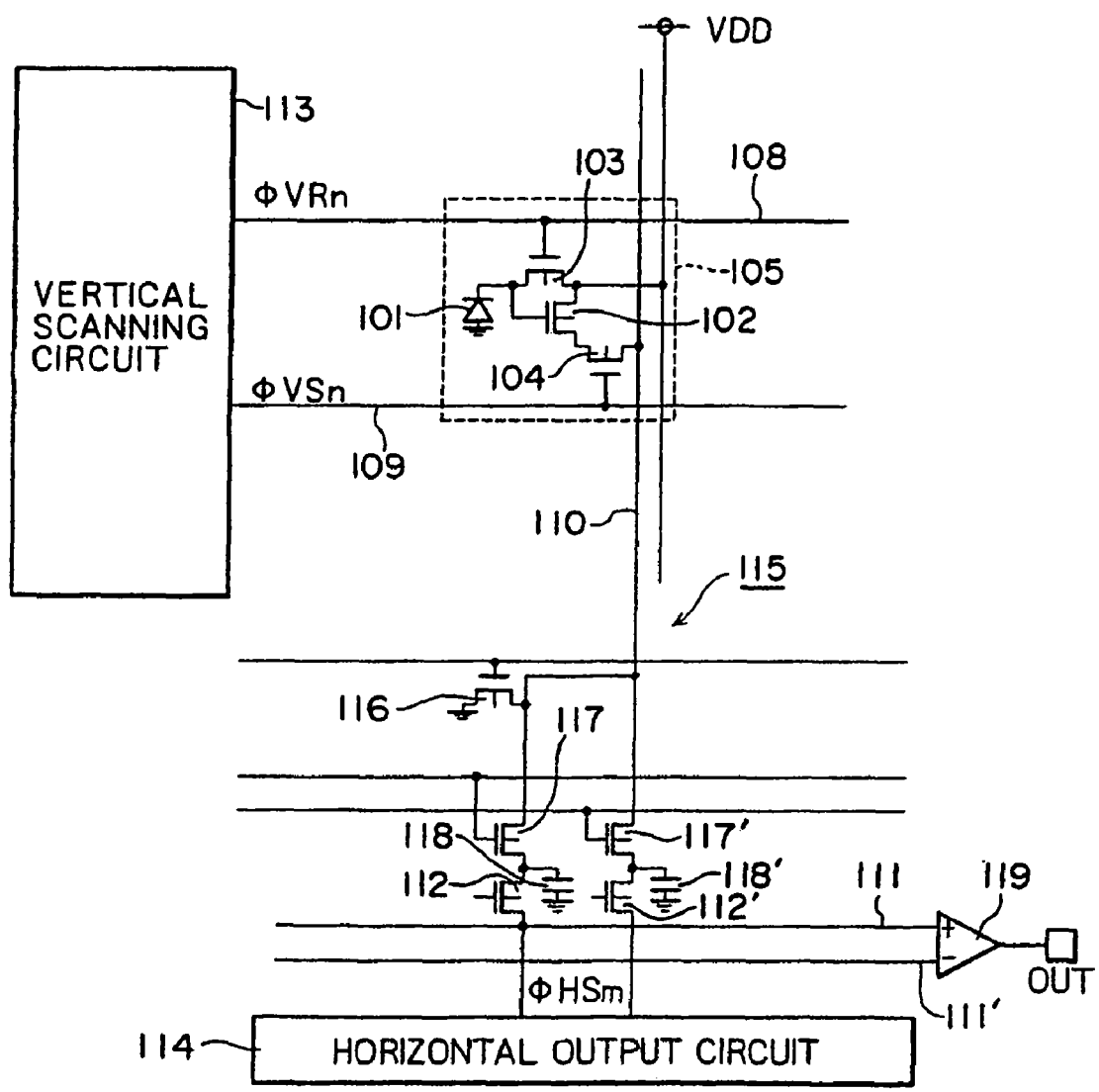
FIG. 15 is a block diagram for explaining the problems in the related art.

Next, the operation of the amplifying type solid-state image sensor in the second embodiment of the above structure will be described below with reference to a potential diagram of FIG. 12 on the basis of a timing chart of FIG. 11.

In a signal read mode (timing a in FIG. 11), the reset MOS transistor 55 is not turned on, so that the signal charge stored in the photodiode 52 is converted into a signal current by the amplifying MOS transistor 53.

In a reset mode (timing b in FIG. 11), a high-level reset pulse φHRm is applied to the gate electrode of the reset MOS transistor 55, whereby the reset MOS transistor 55 is turned on to reset the photodiode 52 completely to the VDD level in its linear region.

In a noise level read mode (timing c in FIG. 11), the reset pulse φHRm is at its low level, and therefore the reset MOS transistor 55 is turned off. Consequently the reset level is converted into a noise current by the amplifying MOS transistor 53. And simultaneously, storage of the next frame is started at this time point (timing d in FIG. 11).

In the pixel 51, the depletion reset gate serves directly as a transverse overflow barrier, and any excess charge above this level is dumped to the power supply. The overflow level corresponds to the low level of the gate potential of the reset MOS transistor 55.

FIG. 13 is a schematic block diagram showing an exemplary structure of a camera of the present invention which employs the aforementioned solid-state image sensor and the method of driving the same.

In FIG. 13, incident light from an object scene is focused on an image forming plane of a solid-state image sensor 220 by an optical system including a lens 210. The solid-state image sensor 220 has the structure explained above. This image sensor is driven on the basis of the aforementioned method by means of a drive 230 including an unshown timing generator.

The output signal of the solid-state image sensor 220 is processed in a signal processor 240 through various stages to become a video signal.

As described hereinabove, according to the solid-state image sensor of the present invention where each of unit pixels has an amplifying function, the relevant photoelectric conversion element is completely reset every time a pixel signal is outputted from each unit pixel, whereby signal components and noise components can be outputted successively from the pixels, so that fixed pattern noise can be suppressed by taking the difference between the pre-reset and post-reset signals. Further, any residual image is not generated owing to complete resetting of each pixel, and generation of fixed pattern noise with vertical streaks can also be suppressed since the signal component and the noise component are outputted via the same path from the vertical signal line to the horizontal signal line.

Although the present invention has been described with reference to some preferred embodiments thereof, it is to be understood that the invention is not limited to such embodiments alone, and a variety of other changes and modifications will be apparent to those skilled in the art without departing from the spirit of the invention.

The scope of the invention, therefore, is to be determined solely by the appended claims.

What is claimed is:

1. A solid-state image sensor comprising a plurality of unit pixels with each unit pixel having:
   (i) a photoelectric conversion element which converts incident light into an electric signal charge and stores the signal charge obtained through such photoelectric conversion;
   (ii) an amplifying element connected between a horizontal signal line and a power supply line with an input of the amplifying element being connected to the photoelectric conversion element;
   (iii) a reset element connected between the photoelectric conversion element and the power supply line;
   (iv) a selection element connected between the amplifying element and the horizontal signal line;
   (v) a reset selection element connected between a horizontal reset line and an input of the reset element; and
   (vi) a vertical scanning line connected to an input of the reset selection circuit and an input of the selection circuit, wherein, the amplifying element is effective to amplify the signal charge stored in said photoelectric conversion element into an electric signal, the reset element is effective to reset said photoelectric conversion element, the selection element and the reset selection element are both controlled by the same vertical scanning signal, said reset element is a depletion mode transistor and the reset element input is a reset gate, and the reset gate of said depletion mode transistor is a transverse overflow barrier to dump excess charge to the power supply.

* * * * *